CERAMIC ELECTROMECHANICAL TRANSDUCER

Filed Feb. 10, 1958

INVENTORS
CARMEN P. GERMANO
MELVIN G. KULLIN
BY
Francis L. Masselle
ATTORNEY

United States Patent Office 3,073,914

Patented Jan. 15, 1963

3,073,914

CERAMIC ELECTROMECHANICAL TRANSDUCER

Carmen P. Germano, South Euclid, and Melvin G. Kullin, Cleveland, Ohio, assignors to Clevite Corporation, Cleveland, Ohio, a corporation of Ohio Filed Feb. 10, 1958, Ser. No. 714,151

12 Claims. (Cl. 179—100.41)

This invention relates to electromechanical transducers and, more particularly, to transducers for stereophonic recording and/or reproduction of sound on record disks.

As used herein the term "electromechanical transducer" denotes a device for translating or converting between electrical and mechanical forms of energy, without regard for the direction of conversion. Thus, while the invention will be described and illustrated as applied to a phonograph pickup, wherein the conversion is from mechanical to electrical, it is also applicable in principle to the converse device—a record cutter—in which case the energy conversion is from electrical to mechanical.

It is also to be understood that the transducing element contemplated by the invention is not limited in application to the field of sound recording and reproduction but can be employed with advantage wherever a transducer capable of simultaneous two-channel operation is required.

The principles and advantages of "binaural" or "stereophonic" sound recording and reproduction systems are well-known in the art. Until recently the practical, commercial realization of such systems has been limited to recordings on electromagnetic tape. The high cost of duplicating pre-recorded magnetic tape recordings, and the expense of satisfactory equipment for sound reproduction from tape has prevented a significant growth in popularity of stereophonic recordings.

It has been proposed to make binaural disk recordings by simultaneously recording in a single groove two stereophonically related sound tracks or channels by using a single cutting stylus driven by two transducers each fed with a respective input signal. One channel would be recorded as a vertical (i.e., "hill and dale") track and the other as the more conventional lateral track. Such recordings would be played back with a stylus driving two transducers coupled to separate amplifier and speaker systems.

The present invention contemplates single transducers capable of recording (or playing back, as the case may be) two stereophonically related signals. In a broader sense, the invention contemplates single transducer elements capable of composing two electrical signals and translating them into a single, resultant mechanical movement or resolving such a movement into its electrical components in predetermined planes.

Electromechanical transducer elements according to the present invention comprise an elongated body of polarizable ferroelectric ceramic material, the body having a longitudinal axis of symmetry and being polarized transversely of said axis. Electrode means are provided on the body including four electrodes on the exterior surface thereof and an internal electrode symmetrically disposed with respect to said axis. The four electrodes are peripherally spaced and arranged in pairs, diametrically opposed, and symmetrically disposed with respect to a plane through said axis. The respective electrodes of each pair are electrically interconnected to form two terminals. The polarization of the ceramic material in the portion of the body underlying two adjacent ones of the four electrodes on the same side of said plane is of opposite polarity from the polarization of the ceramic material underlying the other two of the four electrodes.

It is the basic object of the present invention to provide a novel electromechanical transducer element capable of resolving a mechanical displacement into electrical signals representative of the right angular components of the displacement and, conversely to compose two electrical signals into their resultant in the form of a mechanical displacement.

Another object of the invention is the provision of novel transducer elements, as characterized in the preceding object, which are simple in construction and susceptible of rapid and inexpensive production by ceramic techniques.

Still another object of the invention is the provision of improved electromechanical transducers, embodying transducer elements as characterized in the preceding objects, which are particularly adapted to the stereophonic recording and reproduction of sound on record disks, providing satisfactory channel separation and relatively flat response over the entire range of audio frequencies.

These and further objects will become apparent to those conversant with the art from a reading of the following description and subjoined claims in conjunction with the annexed drawings in which, FIGURE 1 is a perspective elevation, diagrammatic in nature, of an electromechanical transducer according to the present invention;

Figures 1, 2:
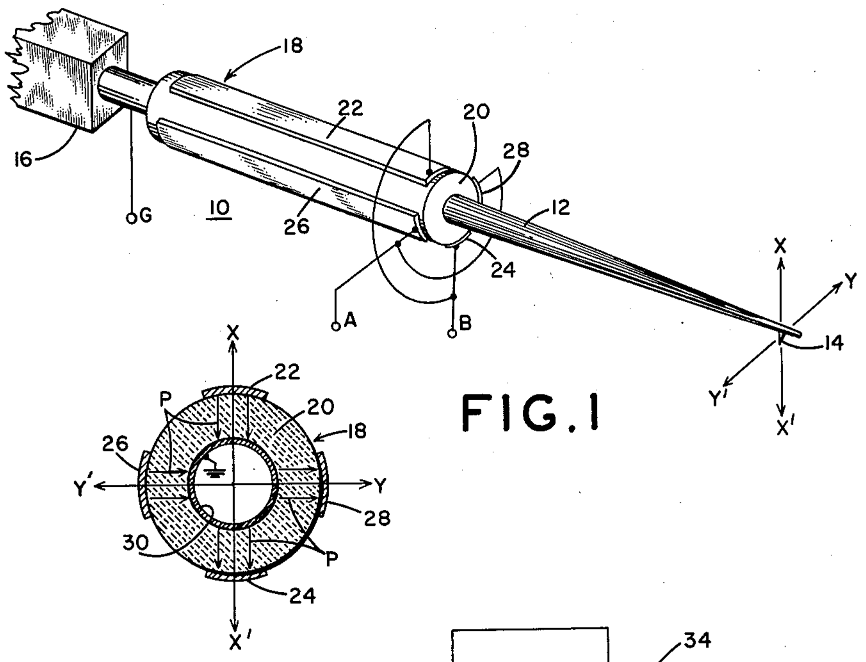
FIGURES 2 and 3 are respective cross-sectional views of transducer elements according to the invention.

Referring now to the drawings wherein like parts are designated with like reference numerals throughout the several views, there is shown diagrammatically in FIGURE 1 an electromechanical transducer 10 which, for purposes of example, will be considered and described as a phonograph pickup.

The transducer 10 comprises a stylus formed of a relatively flexible shaft 12 having a conventional stylus point 14 at one end. Shaft 12 is cantilever mounted having its end remote of stylus point 14 fixedly secured to a suitable support, represented by block 16. Coaxially mounted on shaft 12 is transducer element 18 comprising a tubular body 20 of ferroelectric ceramic material. Transducer element 18 may take different forms, examples of which will be described with particularity as this description proceeds. Transducer element 18 may also be of the type disclosed and claimed in concurrently filed application Serial No. 714,170 of D. P. Faulk, assigned to the same assignee as the present invention. At this juncture it is sufficient to say that transducer element 18 is electromechanically responsive in the flexural mode.

From the structure thus far described it will be seen that motion of the stylus 14 in any path substantially in a plane perpendicular to the coincident longitudinal axes of shaft 12 and body 20 is associated with flexural deformation of the shaft and body.

Body 20 is considerably shorter than shaft 12 and, preferably, is located adjacent the fixed end of the shaft, i.e., remote from stylus point 14. The free end of the shaft projecting from ceramic body 20 is tapered to provide the desired amount of flexural compliance. As this description proceeds it will be appreciated that a preferred construction of the transducer for balance and symmetrical operation as well as for ease of construction, would have body 20 a hollow, thin-walled, right circular cylinder.

The particular material employed for ceramic body 20 may be selected from several known polycrystalline, ferroelectric ceramics which may be polarized by the application of an electrostatic field and retain a remanent polarization. Such ceramics, thus polarized, exhibit an electromechanical response similar to the well-known piezoelectric effect characteristic of many crystalline materials, e.g., quartz, tourmaline, Rochelle salt, etc.

One example of a suitable material is barium titanate, substantially pure or with modifying additions. Ceramic barium titanate transducers, and methods of preparing and poling them are disclosed in U.S. Patent No. 2,486,-560 to Gray.

Another highly satisfactory ferroelectric ceramic transducer material is lead zirconate titanate, $Pb(Zr,Ti)O_3$, disclosed in U.S. Patent No. 2,708,244 to B. Jaffe.

Ferroelectric ceramics such as barium titanate and lead zirconate titanate, substantially pure or containing modifying additions, are characterized by high dielectric constants (600–2000) and high planar coupling coefficients (e.g., 0.35–0.55).

It is well-known in the art that, by poling strips of ferroelectric ceramics in the thickness direction and applying an electric potential across the opposite surfaces, the strip is caused to expand or contract longitudinally depending on the relative polarities of the signal potential and the polarization. Flexural elements (known as "benders") can be made by poling the ceramic body with reversed polarities on opposite sides of a longitudinal centerline. This may be accomplished in a solid member by building it of two laminations bonded together with an electrode interposed, sandwich-fashion. Non-composite ceramic benders and methods of fabricating them are disclosed and claimed in U.S. Patents Nos. 2,624,853 to H. C. Page and 2,659,829 to H. G. Baerwald.

Hollow flexure-sensitive ceramic bodies are disclosed and claimed in U.S. Patents Nos. 2,596,494 to T. E. Lynch and 2,614,143 and 2,497,108 to A. L. W. Williams.

Referring now to FIGURE 2, ceramic body 20 is provided with electrode means comprising an internal electrode 30 covering the inner surface of the body; a first pair of diametrically opposed electrodes 22, 24, and a second pair of diametrically opposed electrodes 26, 28. The first and second pairs of electrodes are circumferentially spaced substantially 90° relative to one another so that mutually perpendicular axial planes through body 20 bisect respective pairs of electrodes. In FIGURE 2, these planes are designated by double-headed arrows Y—Y' and X—X' which, in FIGURE 1, also designate the components of motion imparted to stylus point 14 by the "hill-and-dale" and lateral tracks, respectively, of a binaural record disk (not shown).

As indicated by arrows "P," ceramic body 20 is polarized transversely of its longitudinal axis as will be described presently. The polarization may be and preferably is limited to the regions subtended by respective electrodes 22, 24, 26 and 28 or may extend around the entire body. The polarity of polarization on one side of the body is opposite from that on the other side, e.g., the polarity in the region under adjacent electrodes 22 and 26 is the same, as shown by arrows "P" pointing inwardly; while under electrodes 24 and 28, the arrows "P" point outwardly.

This pattern of polarization may be accomplished in the following manner, assuming specific polarities to simplify the description: electrodes 24 and 28 are connected to one side, say positive, of a suitable D.C. voltage source and electrode 30 is connected to the negative side. The poling voltage is applied and maintained for a sufficient time to effect polarization. Specific fields and times vary with the particular material and other factors and are well-known in the art. Thereafter, the negative side of the voltage source is connected to electrodes 22 and 26 and the positive side is connected to electrode 30.

Other poling methods are possible. For example, one hemi-cylindrical poling electrode could replace signal electrodes 24 and 28 and another, insulated from the first, could replace electrodes 22 and 26. Electrode 30 could be split longitudinally into halves, each half insulated from the other and underlying a respective one of the external hemi-cylindrical electrodes. Thus by connecting one half of the internal electrode to the positive side of the poling voltage source, the other half to the negative side, and the outer hemi-cylindrical electrodes to the respectively opposite sides of the poling voltage, the entire body could be polarized in one step. Thereafter, the poling electrodes could be removed completely and replaced with signal electrodes 22, 24, 26, 28, and 30 or the poling electrodes could be partially removed so as to leave segments suitable for use as signal electrodes.

From the structure thus far described it will be appreciated that if body 20 is flexed in the axial plane X—X' (FIGURE 2) the segment underlying one of the electrodes 22, 24 would be in tension and the segment underlying the other of said electrodes would be in compression. Consequently, a compressive stress in the region of body 20 subtended by electrode 22, such as would result from an upward displacement of stylus point 14, would result in a potential appearing on electrode 22. This potential would be positive or negative depending on the polarity of the polarization and would be directly proportional to the compressive stress and, therefore, the amount of upward displacement of stylus point 14. Simultaneously, the tension in the segment of body 20 subtended by electrode 24 would result in a charge or potential appearing on electrode 24 which is equal in magnitude and, because of the opposite polarization, is of the same sign (polarity) as that on electrode 22. With reversal of the direction of bending, the polarity of the charges is reversed. It will be appreciated that the converse operation, i.e., transducing from electrical to mechanical energy, is accomplished in an analogous manner. Thus for example, a charge of one polarity applied to electrodes 22 and 24 would cause extension of the segment of body 20 underlying one of these electrodes and contraction of the segment underlying the other. If the segment under electrode 22 contracts and that under 24 expands (or remains unchanged, as where no signal is applied) body 20 will bend upwardly so as to move stylus point 14 upwardly.

It will be seen that, during flexure of body 20 in the vertical plane (X—X'), no significant amount of tensile or compressive stress occurs in the segments of body 20 subtended by electrodes 26 and 28. Inasmuch as electrodes 26 and 28 are bisected by plane Y—Y', what little tensile and compressive stress occurs as a result of vertical flexure of body 20, would be equal and opposite under each electrode so that the net potential on electrodes 26 and 28 under such conditions is effectively zero.

It will be understood from the foregoing explanation that an entirely analogous result is obtained when body 20 flexes laterally, i.e., in plane Y—Y', as occurs when stylus point 14 moves horizontally. Thus, flexure in plane Y—Y' generates equal charges on electrodes 26 and 28 and electrical signals applied to the electrodes cause lateral flexure, all in the manner previously described for vertical flexure. Where body is flexed only in plane Y—Y', no significant net charge is present on electrodes 22, 24.

From the foregoing explanation it will be understood that flexure of body 20 in axial plane X—X' only is associated with a maximum charge or potential on electrodes 22 and 24 and a minimum charge or potential on electrodes 26 and 28 while for flexure in axial plane Y—Y' only the converse is true.

If body 20 is flexed in any other axial plane, this flexing is associated with respective charges or potentials on electrodes 22, 24 and 26, 28 which are directly proportional to the respective components of the amplitude of flexure in planes Y—Y' and X—X'. Stated in terms of motion of stylus point 14, the displacement of stylus point 14 in a plane perpendicular to the longitudinal axis of shaft 12 is associated with respective electrical charges at electrodes 22, 24 and 26, 28 which are proportional to the respective vector components of the displacement in axial planes Y—Y' and X—X'.

This action is most clearly apparent if transducer 10 in FIGURE 1 be considered a stereophonic recorder. One of the signals to be recorded is applied to the transducer, e.g., electrodes 22, 24, so as to cause flexural deformation in vertical plane X—X'. A second signal stereophonically related to the first, simultaneously is applied to the transducer to cause flexural deformation in horizontal plane Y—Y'. The first signal, considered alone, would cause vertical displacement of stylus point 14 along line X—X' as if to cut a "hill and dale" sound track in the record groove. The second signal, considered alone, would deflect stylus point 14 horizontally along line Y—Y' as if to cut a conventional lateral sound track in the record groove. The consequence of the coinciding deflections is the cutting of a sound track which is the resultant of both deflections and, therefore, the resultant or composite of both applied signals. This sound track can be resolved into its two components signals, i.e., the two components can be reproduced and segregated by means of transducer 10 operating in a converse manner.

Figure 3:
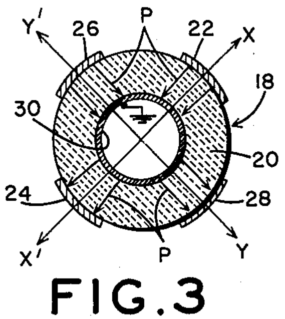

While the planes Y—Y' and X—X' thus far have been shown and described as horizontal (or lateral) and vertical and the corresponding record tracks as lateral and "hill and dale," this has been solely for the purpose of facilitating the exposition of the general subject matter. Thus planes Y—Y' and X—X' may be at 45° to the plane of the record. This arrangement is shown in FIGURE 3 and is preferred because of its balance and symmetry. It will be understood without further explanation that the structure shown in FIGURE 3 is the same, mechanically and functionally, as that in FIGURE 2, except for having been rotated 45° clockwise about the longitudinal axis with respect to stylus point 14.

Figure 4:
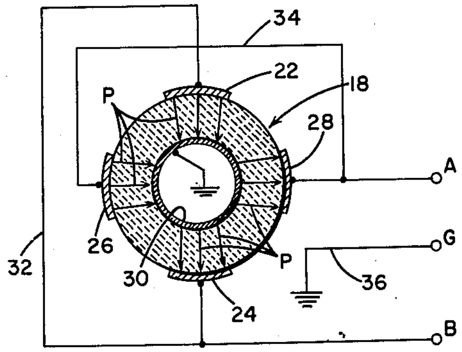
FIGURE 4 is a cross-sectional view of a transducer element according to the present invention, including schematic illustrations of circuit connections thereto; and, FIGURE 5 is a view similar to FIGURE 4 showing a modified form of the invention.

FIGURE 4 illustrates schematically the terminal connections to transducer element 18. Inasmuch as the charges developed on opposite electrodes 22, 24 and 26, 28, respectively, the electrodes of each pair are electrically interconnected. This may be accomplished in any suitable manner such as by means of strips of electrically conductive material applied to body 20. Thus, for example, a strip of electrode forming material could be applied to one end of body 20 connecting electrodes 22 and 24 and at the other end of the body connecting electrodes 26 and 28. Each such connecting strip would provide a terminal connection for its respective channel.

The common or ground terminal is provided by a connection to the internal electrode 30. In an arrangement such as shown in FIGURE 1, this connection can be made through the conductive surface of shaft 12.

In the FIGURE 4 schematic, all connections are shown as made by external conductors. Thus conductor 32 interconnects electrodes 22, 24 to form terminal B and conductor 34 interconnects electrodes 26, 28 to form terminal A. A conductor 36 connected to electrode 30 provides a ground terminal G.

The circuit connections illustrated in FIGURE 4 are operative in the following manner. Assuming upward flexure in axial plane X—X', equal unit charges V are generated on electrodes 22 and 24 and no significant net charges are developed on electrodes 26 and 28. Under these conditions, since electrodes 22, 24 are in parallel, a maximum potential, V, is developed at B with respect to G while a minimum potential, effectively zero, appears on terminal A with respect to G. The same is true with downward flexure in axial plane X—X'. With lateral flexure in axial plane Y—Y', the operation is analogous but the maximum potential is at terminal A and the minimum at B, both with respect to the neutral terminal G.

When stylus point 14 is displaced in a path between X—X' and Y—Y', the concomitant flexure of element 18 occurs in an axial plane other than axial planes X—X' and Y—Y' and the respective potentials at terminals A and B relative to G are proportional to the respective vector components of the displacement in planes X—X' and Y—Y'. Thus, assuming for example the case where stylus point 14 is displaced a unit distance "Z" along a line at 45° to X—X' and Y—Y' (i.e., where element 18 is flexed in an axial plane at 45° to both X—X' and Y—Y'), this displacement has a component in plane X—X' equal to $Z \cos 45°$ or $.707Z$. The component in plane Y—Y' likewise is equal to $Z \cos 45°$ or $.707Z$. Since the potentials developed on the various electrodes are proportional to the displacement (i.e., flexure) in the planes perpendicular to the respective electrodes it will be seen that, on the basis of the assumption of a unit charge V for purely vertical or purely lateral flexure, bending at 45° results in potentials of .707V on each electrode, the polarity depending on the relation of the sign of the stress to the polarity of polarization. Consequently, referring to FIGURE 4, a potential of .707V is developed between terminals A and G and .707V between B and G. The following tabulation sets forth relative values and polarities of terminal potentials:

| Direction of Flexure (Referred to Figure 4) | Potential (Referred to Terminal G) | |
|---|---|---|
| | A | B |
| Vertically Upward | 0 | +V |
| Vertically Downward | 0 | −V |
| Horizontally to the right | −V | 0 |
| Horizontally to the left | +V | 0 |
| 45° Upward and to the right | −.707V | +.707V |
| 45° Downward and to the right | −.707V | −.707V |
| 45° Upward and to the left | +.707V | +.707V |
| 45° Downward and to the left | +.707V | −.707V |

Figure 5:
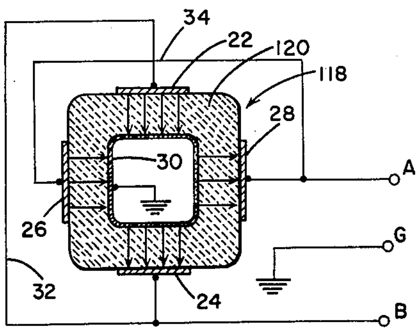

FIGURE 5 illustrates a modified form of transducer element designated generally as 118. Transducer element 118 is in all respects identical to transducer element 18 except that the ceramic body 120 is non-circular in cross-section. As illustrated body 120 is generally square in cross-section but it will be understood that other polygonal sections are satisfactory. Body 120 could be formed with a cylindrical outer surface with "flats" ground on to accommodate the electrodes.

The operation of transducer element 118 is the same as that of the previously described embodiments.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. An electromechanical transducer element comprising: an elongated body of polarizable ferroelectric ceramic material, containing a longitudinal cavity, said body and cavity having a common longitudinal axis of symmetry, the walls of said body being polarized in their thickness direction and with opposite polarity on opposite sides of a plane of symmetry through said longitudinal axis; electrode means on said body including an internal electrode on the inner surface of said walls, serving as a common terminal, and a plurality of spaced electrodes on the outer surface of said walls connected to form two additional terminals, the location and arrangement of said spaced electrodes with respect to said axis being such that flexural deformation of said body in one axial plane is associated with a maximum of electrical potential at one of said additional terminals and a minimum at the other of said additional terminals, with respect to said common terminal, and flexural deformation of said body at right angles to said axial plane is associated with a minimum of electrical potential at said one terminal and a maximum at said other terminal, with respect to said common terminal.

2. An electromechanical transducer element comprising: an elongated body of polarizable ferroelectric ceramic material, said body having a longitudinal axis of symmetry and being polarized transversely of said axis; electrode means on said body including four electrodes on the exterior surface thereof and an internal electrode symmetrically disposed with respect to said axis, said four electrodes being peripherally spaced and arranged in pairs, diametrically opposed, and symmetrically disposed with respect to a plane of symmetry through said axis, the polarization of said ceramic material in the portion of said body underlying two adjacent ones of said four electrodes on the same side of said plane being of opposite polarity from the polarization of the ceramic material underlying the other two of said four electrodes; and means electrically interconnecting the respective electrodes of each pair.

3. An electromechanical transducer element comprising: an elongated body of polarizable ferroelectric ceramic material containing a longitudinal cavity, said body and cavity having a longitudinal axis of symmetry, the walls of said body being polarized in their thickness direction; electrode means including an internal electrode on the inner surface of said walls and two pairs of elongated diametrically opposed electrodes on the outer surface of said walls, one pair rotated substantially 90° about said axis relative to the other pair, the polarization of the region of said body underlying one electrode of each said pairs being of opposite polarity from the polarization of the region underlying the other two of said pairs of electrodes; means electrically interconnecting the respective electrodes of each of said pairs.

4. An electromechanical transducer element comprising: an elongated, thin-walled, tubular body of a polarizable, ferroelectric ceramic material, polarized in a radial direction; an electrode on the inner wall of said body; four circumferentially spaced electrodes on the outer surface of said body elongated in the longitudinal direction of the body, said electrodes being arranged in diametrically opposite pairs so disposed that respective axial planes through said body bisecting the electrodes of a respective pair intersect at substantially right angles, the polarization in the regions underlying opposite electrodes being of opposite polarity; and means electrically interconnecting opposite external electrodes.

5. A phonograph pickup for stereophonic reproduction of sound from binaural disk recordings, comprising: a stylus arm consisting of a relatively flexible shaft having one end fixedly mounted; a stylus on the other end of said shaft; a thin-walled, tubular body of polarizable ceramic materal, shorter than said shaft, coaxially disposed on and closely fitted to said shaft, said ceramic being polarized in a radial direction; a pair of diametrically opposed electrodes on said body electrically interconnected to form a first signal terminal; a second pair of diametrically opposed electrodes on said body circumferentially displaced by 90° from the first pair and electrically interconnected to form a second signal terminal, the polarization of said body in the regions underlying one electrode of each of said pairs being of opposite polarity relative to that of the respective other electrodes of said pairs, at least the surface of said shaft being electrically conductive and in conductive contact with the inner surface of said body so as to serve as an additional electrode and third signal terminal.

6. An electromechanical transducer element comprising: an elongated body of polarizable ferroelectric ceramic material containing a longitudinal cavity, said body and cavity having a common longitudinal axis of symmetry, the walls of said body having inner and outer surfaces and being polarized in their thickness direction between said surfaces, the polarity of polarization being uniform on each side of a plane of symmetry through said longitudinal axis and opposite on opposite sides of said plane; a plurality of longitudinaly extending electrodes on one of said surfaces peripherally spaced about said axis with at least one electrode disposed on each side of said plane of symmetry, said electrodes being located so that respective axial planes through said body bisecting adjacent electrodes intersect at substantially right angles; and an additional electrode in contact with the other of said surfaces opposing said plurality of electrodes.

7. A phonograph transducer for stereophonic recording or reproduction of sound on record disks comprising, in combination: an elongated body of polarizable ferroelectric ceramic material containing a longitudinal cavity, said body and cavity having a common longitudinal axis of symmetry, the walls of said body having inner and outer surfaces and being polarized in their thickness direction between said surfaces, the polarity of polarization being uniform on each side of a plane of symmetry through said longitudinal axis and opposite on opposite sides of said plane; a plurality of longitudinally extending electrodes on one of said surfaces peripherally spaced about said axis with at least one electrode disposed on each side of said plane of symmetry, said electrodes being located so that respective axial planes through said body bisecting adjacent ones of said electrodes intersect at substantially right angles; an additional electrode in contact with the other of said surfaces opposing said plurality of electrodes; means mounting said body cantilever fashion; and a stylus operatively coupled adjacent the free end of said body for transmitting thereto or receiving therefrom substantially rectilinear vibrations substantially in a plane substantially perpendicular to said longitudinal axis and associated with vibration of said body in the flexural mode.

8. An electromechanical transducer element comprising: an elongated tubular body of a polarizable ferroelectric ceramic material polarized in a radial direction, the polarity of polarization being uniform on each side of a plane of symmetry through the longitudinal axis of said body and opposite on opposite sides of said plane; a plurality of electrodes on the outer surface of said body peripherally spaced about said axis and with at least one electrode disposed on each side of said plane, said electrode being located so that respective axial planes through said body bisecting adjacent electrodes intersect at right angles; and an additional electrode in contact with the inner surface of said tubular body in opposition to said plurality of electrodes.

9. A phonograph transducer for stereophonic recording or reproduction of sound on record disks comprising, in combination: an elongated body of polarizable ferroelectric ceramic material containing a longitudinal cavity, said body and cavity having a common longitudinal axis of symmetry, the walls of said body having inner and outer surfaces and being polarized in their thickness direction between said surfaces, the polarity of polarization being uniform on each side of a plane of symmetry through said longitudinal axis and opposite on opposite sides of said plane; a plurality of electrodes on one of said surfaces peripherally spaced about said axis with at least one electrode disposed on each side of said plane of symmetry, said electrodes being located so that respective axial planes through said body bisecting adjacent electrodes intersect at substantially right angles; an additional electrode in contact with the other of said surfaces opposing said plurality of electrodes; means mounting said body cantilever fashion; and a stylus operatively coupled adjacent the free end of said body for transmitting thereto or receiving therefrom substantially rectilinear vibrations substantially in a plane substantially perpendicular to said longitudinal axis and associated with vibration of said body in the flexural mode.

10. A phonograph pickup for stereophonic reproduction of sound from binaural disk recordings, comprising: a thin-walled, tubular body of polarizable ferroelectric ceramic material polarized in a radial direction; a pair of diametrically opposed electrodes on said body electrically interconnected to form a terminal; a second pair of diametrically opposed electrodes on said body circumferentially displaced by 90° from said first pair and electrically interconnected to form a second terminal, the polarization of said body in the regions of underlying opposite electrodes being of opposite polarity; a common electrode means in contact with the inner surface of said tubular body opposing said first and second pairs of electrodes and forming a third terminal; means mounting said body cantilever-fashion; and a stylus operatively coupled to the free end of said body for transmitting thereto or receiving therefrom, substantially rectilinear vibrations substantially in a plane perpendicular to the longitudinal axis of said body and associated with flexural deformation of said body.

11. An electromechanical transducer element comprising an elongated, thin-walled, tubular body of a polarizable ferroelectric ceramic material; electrode means on said body including a plurality of circumferentially spaced elongated electrodes on the outer surface of said body extending lengthwise of said body in substantial parallelism to one another, at least the respective thickness portions of the wall of said tubular body underlying said plurality of electrodes being polarized in the thickness direction and with opposite polarity under at least two adjacent electrodes, the circumferential spacing between adjacent electrodes being such that respective axial planes through said body substantially bisecting adjacent electrodes intersect at substantially right angles, said electrode means further including a counter-electrode on the interior surface of said tubular body in opposition to said electrodes on the outer surface thereof; and means electrically connecting selected ones of said electrodes to form terminal connections for two individual, simultaneously operative signal channels.

12. An electromechanical transducer element comprising: an elongated body of polarizable ferroelectric ceramic material containing a longitudinal cavity, said body and cavity having a common longitudinal axis of symmetry, the walls of said body having inner and outer surfaces; a plurality of longitudinally extending parallel strip electrodes on one of said surfaces spaced about said axis so that respective planes passing through said axis and bisecting said electrodes intersect at substantially right angles; an additional electrode on the other of said surfaces opposing said plurality of strip electrodes, the walls of said body being polarized in the thickness direction between said additional electrode and said strip electrodes, the polarization being of opposite polarity as between at least two adjacent ones of said strip electrodes.

References Cited in the file of this patent

UNITED STATES PATENTS

| | | |
|---|---|---|
| 2,420,864 | Chilowsky | May 20, 1947 |
| 2,515,446 | Gravly | July 18, 1950 |
| 2,518,348 | Mason | Aug. 8, 1950 |
| 2,540,412 | Adler | Feb. 6, 1951 |
| 2,614,143 | Williams | Oct. 14, 1952 |
| 2,625,663 | Howatt | Jan. 13, 1953 |
| 2,944,117 | Gray | July 5, 1960 |

FOREIGN PATENTS

| | | |
|---|---|---|
| 887,596 | France | Nov. 17, 1943 |
| 738,939 | Great Britain | Oct. 19, 1955 |